Fig. 1

Aug. 24, 1954  H. F. SWENSON  2,687,019
DOUBLE-HEADED COMMERCIAL ICE-CREAM FREEZER
Filed Oct. 29, 1951  3 Sheets-Sheet 2

FIG. 2

INVENTOR.
Harvey F. Swenson
BY
Barnes + Seek
atty's

Patented Aug. 24, 1954

2,687,019

UNITED STATES PATENT OFFICE 2,687,019

DOUBLE-HEADED COMMERCIAL ICE-CREAM FREEZER

Harvey F. Swenson, Seattle, Wash.

Application October 29, 1951, Serial No. 253,709

21 Claims. (Cl. 62—4)

This invention relates to commercial ice cream freezers of the type which dispenses a frozen product commonly known as "soft ice cream." In freezers of this nature the custard-like mix from which the product is produced is frozen in a freezing cylinder from which the product is dispensed in individual servings as successive calls therefor arise. The freezing head which contains the cylinder is connected in a refrigeration circuit which includes a motor-driven compressor, and within the cylinder there is provided a dasher, also motor driven, which operates during the freezing action to whip air into the mix so as to give the product the proper consistency. The dasher also urges the frozen product toward the dispensing opening and consequently is activated during each of the successively performed dispensing operations.

There are two general types of dispensing freezer in use. One such type is known as a "continuous operation" freezer in that the cylinder is being continually replenished with small charges of fresh mix as each of a succession of servings are dispensed therefrom, thus keeping the cylinder fully charged at all times. The other type of dispensing freezer has an interrupted operation in that a batch of mix charged to the cylinder is completely dispensed before the cylinder is again charged. This fresh charge must be frozen to a serving condition and during this interval of time, usually in the neighborhood of 15 minutes, the freezing head is "dead" insofar as dispensing of ice cream is concerned. In consequence of these recurrent "dead" periods substantially all establishments using machines of the "interrupted operation" type are more or less compelled to install two machines so that while one machine is "quick-freezing" a fresh charge of mix there will be available in the other machine a supply of the frozen product from which to dispense servings.

The present invention is concerned primarily, but not necessarily, with the "interrupted operation" type of machine, and for its general object aims to provide a unitary machine in which there are contained two individual freezing heads, and in which the heads are each provided with an individual refrigeration system but require only a single compressor, a single compressor motor, and a single condenser to perform the necessary function of circulating refrigerant fluid through both of said systems.

A further and more particular object is to provide an electrical control hook-up which operates automatically to bring charges of mix contained in the respective heads to proper serving condition and to maintain said condition as servings are successively dispensed therefrom.

As a further object still the invention aims to provide, for the two interconnected refrigeration systems, an electrical control hook-up which introduces an interlock and operates automatically in response to the activation of either of said refrigeration systems to isolate and inactivate the other refrigeration system.

With these and other still more particular objects and advantages in view, and which will each appear and be understood in the course of the following description and claims, the invention consists in the novel construction and in the adaptation and combination of parts hereinafter described and claimed.

In its broad concept the present invention, as above stated, provides two freezing heads designated in the drawings by the numerals 20 and 20', and employs therewith refrigeration circuits in which there is contained a single compressor 4, a single condenser 5, and a single electric motor 6 for powering the compressor. The two freezing heads each present a cylinder in which cream, fluid custards and the like are to be frozen, and such cylinders are desirably hollow-walled to produce an expansion chamber into the bottom of which the refrigerant, in liquid form, is supplied under pressure from the condenser and from the top of which the refrigerant, in gas form, is fed back to the compressor. The pressure and suction pipes of said refrigeration circuits, one for the head 20 and the other for the head 20', are denoted by 21 and 22 and 21' and 22', respectively. The usual expansion valves 23 and 23' are provided in said feed pipes, and there is also provided the usual high-pressure cut-out 7 which is subjected to the pressure of the refrigerant liquid and operates through an electric switch 8 to open the electric circuit, hereinafter to be described, for the electric motor 6. Disposed above each of said freezing heads there is provided a reservoir, as 24 and 24', in which a supply of the mix to be frozen is received, and connecting said reservoirs with the freezing chambers of the related freezing heads are valved gravity-flow pipes, as 25 and 25'. The valves for said pipes are or may be of the nature illustrated and described in my pending application, Ser. No. 206,280, filed January 16, 1951, and namely cone-shaped self-closing valves 26 and 26' opened by activation of solenoids 27 and 27'. Each freezing head has a valved discharge opening through which the frozen contents are dispensed in individual servings as successive calls therefor arise, and such valves, designated by 28 and 28', are here shown as being hand-operated but the same can self-evidently be operated by a foot-switch, as shown in my above-identified pending application, or in any other suitable manner. Within the cylinders there is provided a respective dasher which serves the usual double-duty function of blending the mix contained in the cylinder and also urging the mix forwardly toward the dispensing opening, and for the activation of the dashers there is provided a respective electric motor, as 29 and 29', passing its drive to the related dasher by reduction gearing contained in a respective gear case, as 30 and 30'.

Figure 1:
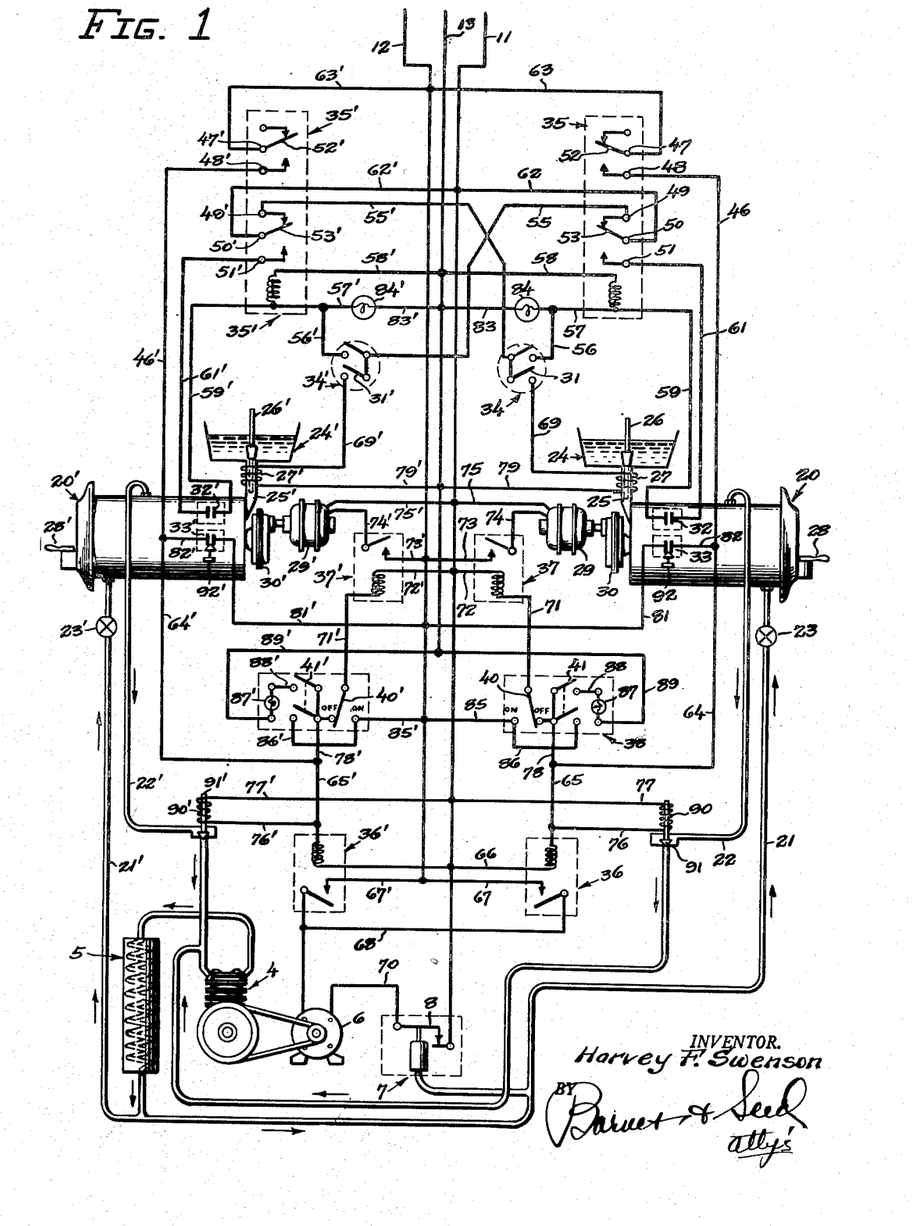
Figure 1 is a diagrammatic view portraying a double-headed commercial ice cream freezer constructed in accordance with one embodiment of the present invention.
Figure 2:
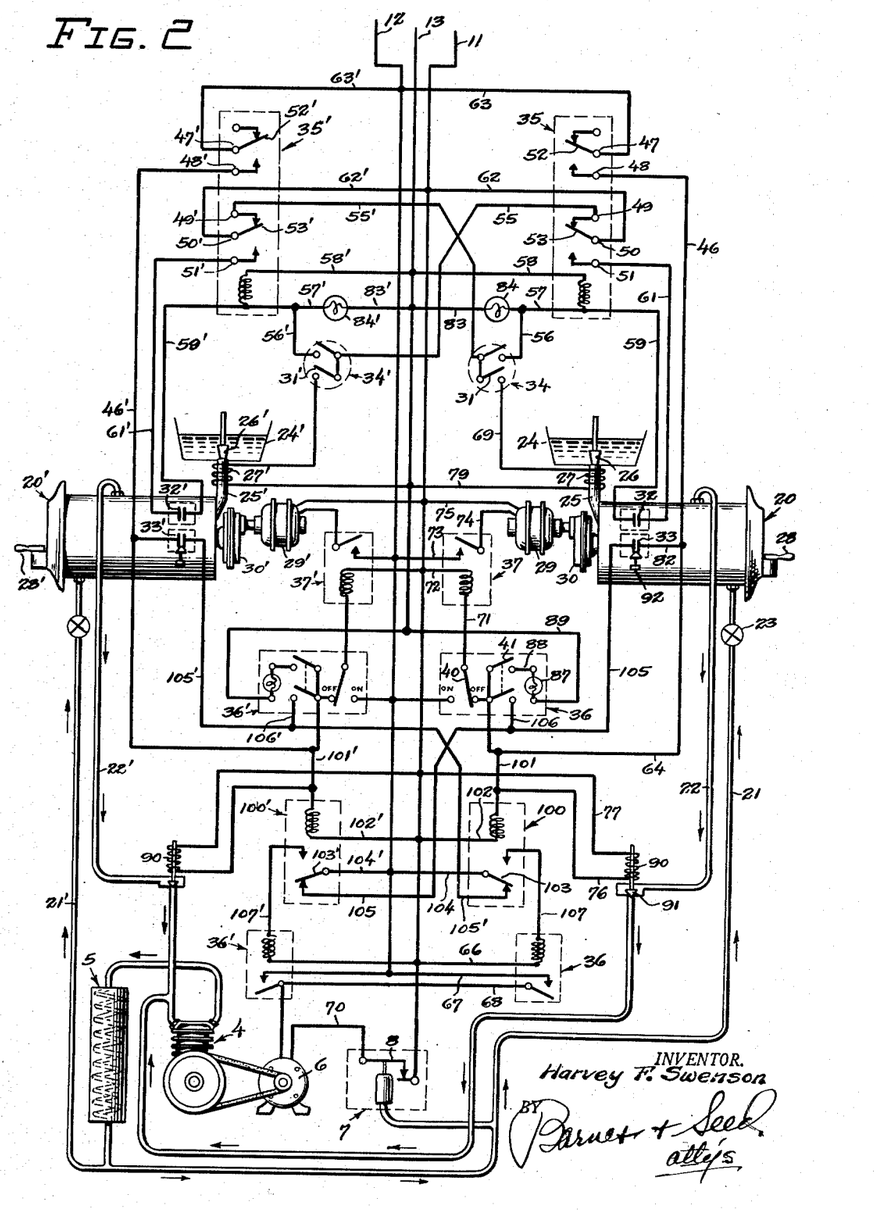
Figs. 2 and 3 are diagrammatic views illustrating other and modified hook-ups within the teachings of the present invention.
Figure 3:
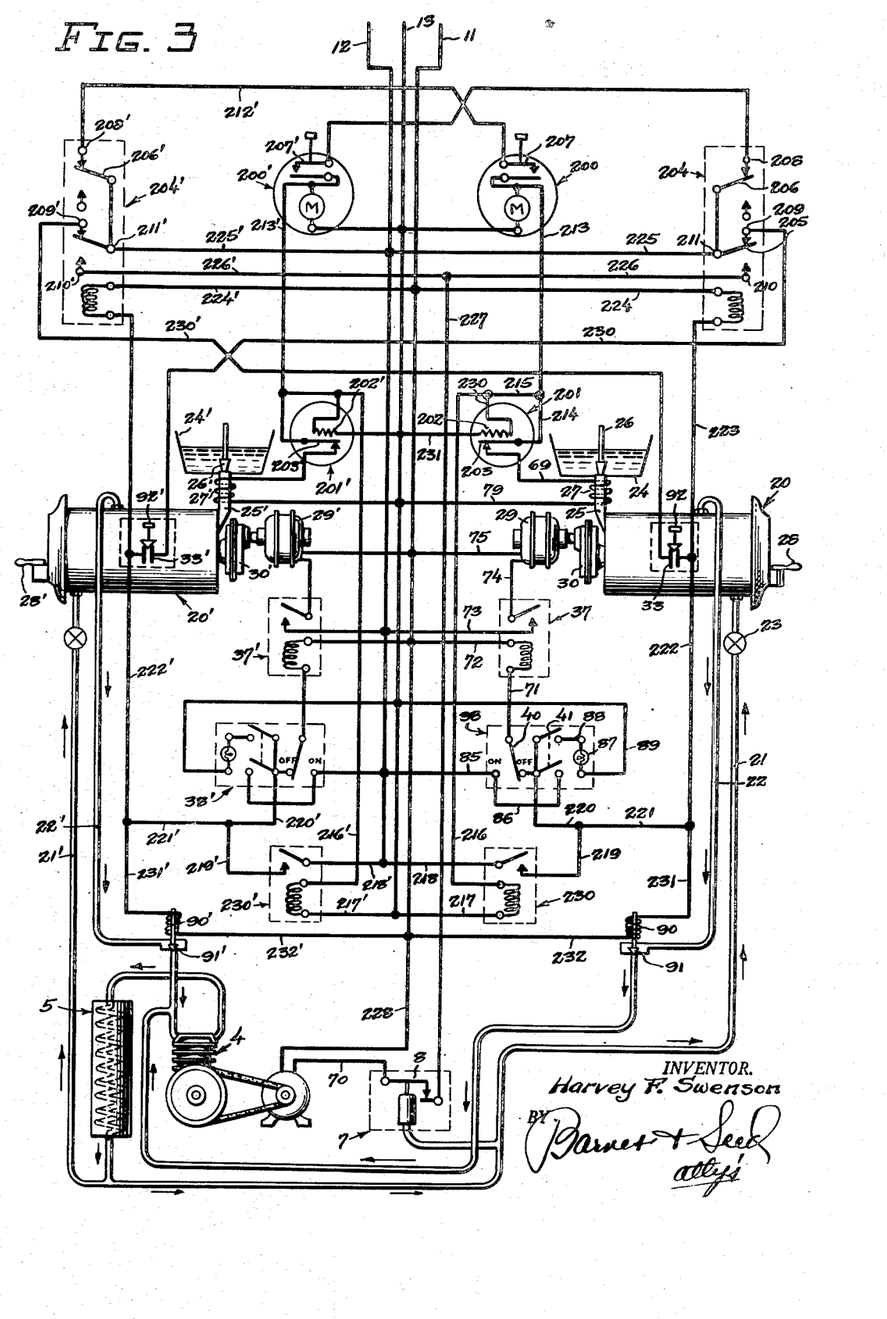

The working parts of my described double-headed commercial ice-cream freezer, other than for the dispensing valve which I have elected to show as being hand-operated, are controlled either by an electric device or by a device which is subject to an electric control, and these electric devices may advantageously be wired in several ways. Three basically similar hook-ups are diagrammed in the three views of the drawings, being distinguished only in that (1) they employ different methods of controlling and timing initial quick-freeze cycles and (2) they provide greater or lesser interlocking between the control mechanisms. Of the three hook-ups, that shown in Fig. 3 is ordinarily preferred in that it is more automatic than the other two and hence requires less attention by the operator. Being, however, more elaborate, the same is costlier to produce. Each of the three hook-ups draws electric current from a 3-wire 220 volt service circuit. 11 and 12 designate the two hot wires and 13 the neutral wire of such service circuit.

First describing the hook-up shown in Fig. 1, this being the simplest of the three illustrated embodiments, it will be seen that there are associated with each of the freezer heads two separate temperature controls, each reflecting the temperature condition which obtains within the evaporation chamber of the head. Denoted by 32 and 33 in the instance of the head 20 and by 32' and 33' in the instance of the head 20', the controls 32 and 32' each open when the same reach a given low temperature point, say between −5° F. and 0° F. The low temperature at which the other controls 33 and 33' open is high by comparison, say 16° F. Controls 33 and 33' close as the temperature rises above a somewhat higher point, say 20° F. In addition to such temperature controls, there is associated with each head the following electric devices: a respective double-pole manually-closed switch, as 31 and 31', contained in a manually-set timer unit, as 34 and 34', so constituted as to open the switch automatically upon the expiration of a given time setting, desirably 60 seconds; a "quick-freeze" relay, as 35 and 35'; a condenser-motor relay, as 36 and 36'; a dasher-motor relay, as 37 and 37'; and a manual control box, as 38 and 38'. Single and double-pole switches 40—41 and 40'—41' are provided in each of said control boxes. The "quick-freeze" relays 35 and 35', in addition to the two binding posts for the employed solenoid, each provide five binding posts designated by 47, 48, 49, 50 and 51 and by 47', 48', 49', 50' and 51', respectively, and as a functioning complement of these posts there are provided solenoid-activated switch blades 52—53 and 52'—53', respectively.

The manner in which the above-mentioned electrical devices are wired into a two-sided unitary system will become apparent as the following description of the operation is given. There are identical circuits for each of the two sides and while the description, for simplicity, will be largely confined to an explanation of the circuits provided for the right hand side, and namely the side which includes the head 20, reference numerals are applied in the drawing to designate the corresponding connections for the left side of the system, differentiating the left-side from the right-side by prime marks. This same pattern will be later followed as the circuits for the Fig. 2 and Fig. 3 hook-ups are described. Electrical devices and connections which are common to all three of my illustrated hook-ups are denoted in the three views by the same reference numerals.

Assuming, as respects the Fig. 1 hook-up, that the operator wishes to freeze a charge of mix in the head 20 preparatory to dispensing therefrom, the first step is to close the double-pole switch 31 which, as above stated, is timer-controlled so as to open automatically at the expiration of a 60-second interval. One blade of this switch closes a circuit which energizes the solenoid of the "quick-freeze" relay 35, the current in this case passing from the hot line 11 through the wire 62' to the post 50' of the inactive relay 35'. Such post connects by switch blade 53' with post 49' and the supplied current passes from the latter post through wire 55' to one side of the closed switch 31, thence by wires 56, 57 and 58 through the solenoid to the neutral 13, the energized solenoid activating switches 52 and 53 so that posts 47 and 50 are connected with posts 48 and 51, respectively. Coincident with the closing of the switch 31 and the responsive energizing of the solenoid contained in the relay 35, a circuit through the solenoid of the condenser-motor relay 36 is completed, the current passing from hot line 12 by wire 63, switch blade 52, and wires 46, 64 and 65 to the solenoid, and thence by wire 66 to the hot line 11. Another circuit is at the same time completed through the solenoid of the dasher-motor relay 37, the current being here taken from wire 64 and passing by wire 78 through the "off"-positioned switch 40 of the manual control box 38 to wire 71 which connects with one terminal of the solenoid, the other terminal connecting by wire 72 with hot line 11. Two other circuits are also simultaneously closed, one through the temperature control 32 and the other through the mix-valve solenoid 27. The latter of these circuits includes the other of the two blades of the double-pole switch 31, with current being drawn by wire 54', switch blade 53, and wire 55' from hot line 11, passing through wire 69 to said solenoid, and thence by wire 79 to the neutral 13. The former of the last-mentioned two circuits, and namely the circuit which includes the low-temperature control 32, passes from hot line 11 through wire 62, switch blade 53, and wire 59 to the control, and thence by wire 59, wire 57, and wire 83 to neutral 13. It is to be particularly noted that the wire 59 of said temperature-control circuit connects with the solenoid of the "quick-freeze" relay 35, wherefor the solenoid remains energized after the timer-controlled switch 31 is opened and until such time as the control 32 opens. Consequently, the only one of the described electrically-operated devices which becomes inactivated upon the opening of the timer-controlled switch is the solenoid 27 which governs the delivery of mix into the head 20. As long as the solenoid for the relay 35 remains energized, the solenoids for the relays 36 and 37 are energized, and current is supplied by wires 67, 68 and 70 to the compressor motor 6 and by wires 73, 74 and 75 to the dasher motor 29. Current drawn from wire 65 and passing by wires 76 and 77 to the hot line 11 operates by the responsive energizing of a solenoid 90 to open a valve 91 in the suction line 22 of the refrigerant circuit so that this line opens and closes in concert with the activation and de-activation of the compressor.

There is a considerable heat conduction lag during the initial quick-freeze operation and it develops that by the time the temperature within the expansion chamber has dropped to the approximate zero temperature at which the control 32 cuts out the mix will have arrived at a temperature of, say, 19° F. The "quick-freeze" relay 35 and the temperature control 32 have now served their purpose and become inactive, evidenced visually as the pilot light 84 goes off.

Now that the mix is down to the desired temperature the high-temperature control 33 takes over the responsibility of supplying current to the compressor and dasher motors, cutting in and out as necessary to maintain the mix in a proper condition for serving. Current in such case passes from hot line 12 through wire 81 to the control 33, and thence by connecting wires 82, 64 and 65 to the solenoid of the relay 36 and by connections 64, 40, and 71 to the solenoid of the relay 37. The foregoing is to say that as the temperature in the expansion chamber, which now is in fairly close correspondence with the temperature of the mix, rises above the high point of the specific temperature limit, say 20° F., the compressor and the dasher both become activated and continue to work until the temperature drops to the low point, continually cutting in and out at intervals until the frozen contents of the head 20 are entirely dispensed by repeated servings.

In the meantime, after the "quick-freezing" of the head 20 has been completed, the operator is free to "quick-freeze" a batch of mix in the other head 20', the doing of which requires only that the switch 31' be closed. Inasmuch as the solenoid of the relay 35 is de-energized, current is enabled to pass from hot line 11 through wire 62, switch blade 53, and wire 55 to one side of said closed switch 31', and by the connecting wires 56' and 57' passes from the other side of said switch to the solenoid of the relay 35' and thence by wire 58' to the neutral 13. The identical operations, occurring simultaneously and in sequence, which were above described in connection with the head 20, now take place in connection with the head 20'.

The two dashers, one for the head 20 and one for the head 20', and the compressor which is common to the refrigerant circuits of both heads may be controlled manually through operation of the switches 40 and 41 or 40' and 41' contained in the control boxes 38 and 38', as the case may be. Considering the switch 40, moving the same from "off" to "on" position completes a circuit through the solenoid of the relay 37 from hot line 12 to hot line 11, the traced path of the current including wire 85, switch 40, and wires 71 and 72. The operator closes said switch, so as to operate the dasher, whenever a serving is being dispensed from the freezing head. Considering the switch 41, which is a double-pole switch, moving the same from open to closed position completes two circuits, one from hot line 11 to hot line 12 through the solenoid of the compressor-motor relay 36, using the wire connections 66, 65, 86 and 85. The other is from hot line 11 to the neutral line 13 through pilot light 87, the current in this instance traversing the wires 85, 86, 88 and 89. When switch 41 is closed the operator must necessarily be on guard to open the circuit after the expiration of a given time interval as there is no temperature control associated therewith. The use of switch 41, or switch 41', is only infrequently called for. If, say, there is a power failure and frozen mix contained in the heads should thaw, the operator could then re-freeze by using the two manual switches 40 and 41, or 40' and 41', after restoration of electric service. Use of the timer-controlled switch in this situation would perforce introduce fresh mix and thus overload the freezing cylinder. It will be apparent that thawed mix could be again frozen to specified serving temperature solely by the action of the temperature-control 33, without any manual attention whatever, but the system would then repeatedly "cycle" off and on over an unnecessarily long period of time before finally bringing the mix down to the required temperature.

The disadvantages of the above-described hook-up are as follows:

(a) There is no interlock between the temperature-responsive controls 33 and 33' and either of said controls can close its respective circuit at the same time that the circuit of the other control is closed. When such occurs the compressor necessarily shares its output between the two heads. Two such heads, in their correction of mix temperatures, respond slower than is the case when the full output is available for a single head.

(b) There is no interlock between the manually controlled switches 41 and 41' and thus an operator, even though instructed otherwise, might close both switches at once. The functioning of the compressor is so reduced when forced to carry both heads that there is a loss of efficiency out of proportion to the load carried.

(c) The operator must be present and on the alert to see that the timer-controlled switch for the second head 20' is closed as soon as the pilot light 84 goes out if, as is usually desired, both heads are to be charged and the charges properly conditioned for serving in a minimum length of time.

The disadvantages enumerated in (a) and (b) above may be overcome by employing the hook-up which I have illustrated in Fig. 2, and which requires only that one additional relay be provided for each of the two heads. The added relay for the head 20 is designated by 100 and the added relay for the head 20' is designated by 100'. In wiring the relay 100 into the circuit, wires 101 and 102 which correspond to the wires 65 and 66 of the Fig. 1 circuit are connected to the two sides of the relay's solenoid. The switch 103 provided in this relay is a double-acting switch of the same type employed in the relays 35 and 35'. In the normal inactive condition of the relay, such switch occupies a position whereat it connects two wires 104 and 105'. The former wire runs from the hot line 12 and the latter wire runs to the temperature control 33'. A branch wire 106' also leads from this wire 105' and connects with a free post of the manually-operated double-pole switch 41', replacing the wire 86' used in the Fig. 1 hook-up. In the active condition of the relay, and namely when the concerned solenoid is energized, said switch 103 connects the wire 104 with a wire 107. This wire 107 acts with wire 66 to complete a circuit to the hot line 11 through the solenoid of the compressor-motor relay. In the Fig. 2 hook-up it will thus be seen that there is a cross-over connection which acts by an energizing of the solenoid in either of said relays 100 or 100', as the case may be, to responsively hold the circuit for the solenoid of the other relay in an open condition, whether the solenoid be energized by action of the temperature control or by the act of manually closing the double-pole switch of the control box.

In the hook-up of Fig. 3 which, as with the Fig. 2 hook-up, precludes freezing of both heads simultaneously, the temperature controls 32 and 32' are deleted and in lieu thereof electrically driven timers, as 200 and 200', are employed. These timers admit of being set so as to cut off the quick-freeze cycle after a specified length of time, say 15 minutes. Upon the completion of the initial quick-freeze actions, the temperature controls 33 and 33' take over.

The timers 200 and 200' are interlocked through the compressor-motor relays 36 and 36' so that when one timer is active the other timer is inactivated. This arrangement is of particular advantage in that it enables the operator to set both timers at the same time, thus overcoming the third of the disadvantages enumerated above in respect of the Fig. 1 hook-up, and namely the required attendance of the operator in order that the quick-freezing of head 20' may be started when the quick-freezing of head 20 has been completed. The main timers each have an auxiliary timer, as 201 and 201', associated therewith, and such auxiliary timers replace the timers 34 and 34' of the previously described hook-ups in performing the office of energizing the mix-feed solenoids 27 and 27'. These auxiliary timers have contained therein a thermogenic element, as 202 and 202', which develops a sufficient rise in temperature upon the expiration of a 1-minute interval to open a thermostatic switch, as 203 and 203', included in the circuit for the mix-feed solenoid. It will be noted that the temperature controls 33 and 33' are here interlocked through the compressor-motor relays so that in this hook-up, as with the hook-up of Fig. 2, it becomes impossible for the compressor to carry the load of both freezing heads simultaneously. In addition to the changes mentioned, the Fig. 3 hook-up replaces the relays 35 and 35' with relays 204 and 204', and re-wires the relays 36 and 36', here designated by 230 and 230', so as to be in series with the timers and such relays hence are divorced from the compressor motor and operate in this instance to isolate the timers. The previously performed function of opening and closing said compressor-motor circuit is performed by said relays 204 and 204'. Such relays 204 and 204' each provide two connected switch blades, as 205—206 and 205'—206', and present three binding posts in addition to the two posts for the root ends of the switch blades and the two posts for the solenoid.

Tracing the wiring in this hook-up as it pertains to the head 20, it will be seen that upon activation of the button switch 207 which closes the motor circuit and sets the timer 200 in motion, circuits are completed simultaneously through the solenoid 27, the dasher motor 29, and the compressor motor 6. The first said circuit includes the normally closed switch 203 with the current being drawn from hot wire 12 and passing by wire 225' to the root post 211' of the double-pole switch of the relay 204'. With the solenoid of this relay de-energized, the current is carried through the switch blade 206' to the post 208' and thence by wire 212' to the timer 200, passing through the closed switch 207 of the latter. Wires 213 and 214 lead to the normally closed switch 203 of the auxiliary timer and complete a circuit through solenoid 27 to the neutral 13 by wires 69 and 79. The circuits to the compressor and dasher motors follow the same path to the point of juncture of wires 213 and 214, from whence the current passes along connecting wires 215 and 216 to the solenoid of the relay 230 and thence by wire 217 to neutral 13. The responsive closing of the switch contained in this relay 230 completes two circuits. One is from hot line 12 to hot line 11 through the solenoid of the dasher-motor relay 37 by way of wires 218, 219, 229, 71 and 72, using the inactive switch 40 of the manual control box 38 to carry the current from wire 220 to wire 71. The other circuit closed by the energizing of said relay 230 is from the hot line 12 to the hot line 11 through the solenoid of the relay 204, using wires 218, 219, 222, 223 and 224. The double-pole switch of such relay 204, responding to the magnetic pull, makes connection across the posts 210 and 211 and completes a circuit to the compressor motor 6, the current being carried by wires 225, 226, 227, 70 and 228 from hot line 12 to hot line 11. Coincident with the simultaneous completion of the recited circuits, current also passes by wires 230 and 231 through the thermogenic element 202 of the auxiliary timer 201. The temperature rise in element 202 occurring at the expiration of a 1-minute interval causes switch 203 to open and responsively break the circuit to the solenoid 27, shutting off the introduction of mix to the freezing head. The quick-freeze cycle continues until the timer 200 has run its time setting, ordinarily 15 minutes, and each of the described circuits then becomes broken, whereupon the other and previously set timer 200' goes into operation automatically in that the two switch blades of the relay 204 assume the position in which they are shown in the drawing, permitting current to pass between the posts 211 and 208 and thus completing a circuit which includes the solenoid of the relay 230' in series with the switch 207' of the timer 200', the wires through which the current passes being 225, 212, 213', 214', 216' and 217'.

Following completion of the quick-freeze cycles, the temperature controls 33 and 33' take over. For the head 20, the circuit which is completed upon a closing of control 33 runs from hot line 12 by wire 225' to post 211', thence across the switch blade 205' to post 209' and therefrom by wire 230' to one side of the temperature control. From the other side, wires 223 and 224 make connection through the solenoid of relay 204 with hot line 11. Coincident with imposition of current upon said solenoid of the relay 204, whether by completion of a circuit through the temperature control or through the solenoid of the relay 36, current passes by wires 231' and 232' through the solenoid 90 which controls the valve 91 for the suction line of the refrigerant circuit.

It will be apparent from an inspection of the three illustrated hook-ups that the dasher for either head may be operated at any time, independently of the operation of the compressor, by merely moving the switch 40 of the manual control box from its normal "of" to the "on" position. While the entire electric system may be isolated from the service lines by throwing a master switch, it is desirable to provide, for the temperature controls 33 and 33', a button adapted to be depressed by the operator when the machine or an individual head thereof is not in use and which operates by such depression to hold the contacts of the temperature control separated.

Minor changes in the wiring hook-ups may be resorted to without departing from the spirit of the invention and it is accordingly my intention that no limitations be implied and that the hereto annexed claims be given a scope fully commensurate with the broadest interpretation to which the employed language admits.

What I claim is:

1. In a commercial ice cream freezer, in combination: two freezing heads, a respective refrigeration system for each of said heads including, common to both systems, a single compressor and a single electric motor for driving the compressor, individual normally open electric circuits for the two heads including the motor in each of said circuits, and means operating automatically in response to a closing of either of said circuits for bringing the activated compressor into functioning relation to the refrigeration system of the head to which said circuit is related while isolating said compressor from the refrigeration system of the other head, said circuits each including a respective manually closed switch inactivated automatically upon the expiration of a given time interval.

2. In a commercial ice cream freezer, in combination: two refrigeration systems each of which includes a freezing head and having, common to both systems, a single compressor and a single electric motor for driving the compressor, a respective valve for each of said refrigeration systems movable from a normal closed position isolating the related freezing head into an open position permitting circulation of refrigerant through the system, an electric device for each of said valves operable when energized to open the valve, a respective switch and a respective relay for each of said two refrigeration systems, and a respective normally open electric circuit for each of said two refrigeration systems acting upon completion to energize the related relay, the motor, and the related valve-opening electric device and requiring for said completion that the related switch be closed and the non-related relay be de-energized.

3. In a commercial ice cream freezer, in combination: two freezing heads, two refrigeration systems, one for each of said heads, each including the related head and having, common to both systems, a single compressor and a single electric motor for driving the compressor, a respective dasher for each of said heads, a respective electric motor for driving each of said dashers, a respective valve for each of said refrigeration systems movable from a normal closed position isolating the related freezing head into an open position permitting circulation of refrigerant through the system, an electric device for each of said valves operable when energized to open the valve, sets of normally open electric circuits, one set for each of said refrigeration systems, including in each set the compressor-motor, the related dasher motor, and the related said electric device, switch devices for each of said sets of electric circuits including, in each set, a manually-closed master-switch and a follow-up switch operative individually to complete all of the electric circuits in a respective said set, a respective timer device related to each set of circuits and operable to open the master switch upon the expiration of a given time setting, and a respective device related to each of the follow-up switches made responsive to the temperature condition of a related freezing head for opening and closing the concerned switch as the temperature of the related head falls below and rises above the bottom and top limits of a given temperature range.

4. The freezer of claim 3 wherein there is provided for the motors which drive the compressors and the dashers a respective additional electric circuit including the related motor and a related circuit-closing switch opened and closed manually at will.

5. The freezer of claim 4 in which current imposed upon the dasher motors in response to a closing of either the related master switch or the related follow-up switch passes through the blade of the related manually operated switch.

6. In a two-sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for each of said refrigeration systems movable from a normal closed position into an open position whereat refrigerant is permitted to circulate through the related systems, a respective electrically operated device for opening said valves, a respective master switch and a respective relay for each of said two sides of the freezer, and a respective normally open electric circuit for each of said two sides of the freezer acting upon completion to energize the related relay, the related two motors and the related valve-opening electric device and requiring for said completion that the related master switch be closed and the non-related relay be de-energized.

7. In a two-sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for each of said refrigeration systems movable from a normal closed position into an open position whereat refrigerant is permitted to circulate through the related system, a respective electrically operated device for opening said valves, a respective manually closed master switch for each of said two sides of the freezer made to open upon the expiration of a given time interval, a respective follow-up switch for each of said two sides of the freezer thermally controlled to open and close at the high and low limits of a given temperature range, respective sets of relays for each of said two sides of the freezer, and two respective sets of normally open electric circuits for each of said two sides of the freezer acting upon completion of either of said sets to energize the related relays, the related two motors, and the related valve-opening electric device and each so wired as to require for the completion of one of said sets of circuits that the related master switch be closed and one of the relays contained in the non-related set of relays be de-energized and to require for completion of the other of said sets of circuits that the follow-up switch be closed and another of the relays contained in the non-related set of relays be de-energized.

8. In a two-sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for each of said refrigeration systems movable from a normal closed position into an open position whereat refrigerant is permitted to circulate through the related system, a respective electrically operated device for opening said valves, a respective pair of control switches for each of the two sides of the freezer one of which is a normally closed switch thermally governed to cut out at a given low temperature and the other of which is thermally governed to open and close at the high and low limits of a given temperature range the low limit of which is appreciably higher than the temperature at which the first mentioned switch cuts out, a respective relay for each of said two sides of the freezer, and two respective sets of normally open electric circuits for each of said two sides of the freezer acting upon completion of either of said sets to energize the related two motors and the related valve-opening device, and in respect of one of said sets also energizing the related relay, the set of circuits which includes the relay also including the related low-temperature control switch and requiring for its completion that said switch be closed and the related relay be energized, the other of said sets to circuits including the high-temperature control switch and requiring for its completion that said control switch be closed, a respective separate normally open circuit being also provided for each of said two sides of the freezer acting upon completion to energize the related relay, said last-named circuit including a manually closed switch which is caused to open upon the expiration of a short time interval and being so wired through said related switch and through the relay related to the other side of the freezer as to require for its completion that the switch be closed and that the non-related relay be de-energized.

9. In a two-sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for the suction line of each of said refrigeration systems movable from a normal blocking position into an open position permitting refrigerant to circulate through the system, a respective electrically operated device for opening said valves, respective sets of switch devices related to each of said heads and including, in each set, one manually closed starter switch, a normally-closed follow-up switch thermally controlled to cut out at a low temperature, a follow-up switch thermally controlled to open and close at the high and low limits of a higher temperature range, and a #1, a #2, and a #3 relay, said starter switch being wired in a series circuit which passes through the inactive switch mechanism of the non-related #1 relay and being timer-controlled so as to open automatically upon the expiration of a given short-interval time setting, respective electrically operated means for each of said heads operative when activated to deliver a charge of mix to the related head, and a plurality of normally open series electric circuits for each of the two sides of the freezer, one of said circuits including the starter switch and the solenoid of the #1 relay, another of said circuits including the starter switch and the electrically operated means which charges the mix, still another of said circuits passing through the activated switch mechanism of the energized #1 relay and including the low temperature follow-up switch and the solenoid of the #1 relay so as to be self-energizing for activation of the concerned switch mechanism, yet others of said circuits each passing through the activated switch mechanism of the related #1 relay and in one instance including said electrically operated valve-opening device, in another instance including the solenoid of the #2 relay and in yet another instance including the solenoid of the #3 relay, still others of said circuits including in one instance the motor for the compressor and in another instance the motor for the dasher and passing through the activated switch mechanisms of the #2 and the #3 relays, respectively, and still others of said circuits each including the high temperature follow-up switch together with, in a first instance, the solenoid for the #2 relay, in a second instance the solenoid for the #3 relay, and in a third instance the electrically operated valve-opening device.

10. In a two sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for the suction line of each of said refrigeration systems movable from a normal blocking position into an open position permitting refrigerant to circulate through the system, a respective electrically operated device for opening said valves, respective sets of switch devices related to each of said heads and including, in each set, one manually closed starter switch, a normally-closed follow-up switch thermally controlled to cut out at a low temperature, a follow-up switch thermally controlled to open and close at the high and low limits of a higher temperature range, and a #1, a #2, and a #3 relay, said starter switch being wired in a series circuit which passes through the inactive switch mechanism of the non-related #1 relay and being timer-controlled so as to open automatically upon the expiration of a given time setting, and a plurality of normally open series electric circuits for each of the two sides of the freezer, one of said circuits including the starter switch and the solenoid of the #1 relay, still another of said circuits passing through the activated switch mechanism of the energized #1 relay and including the low-temperature follow-up switch and the solenoid of the #1 relay so as to be self-energizing for activation of the concerned switch mechanism, yet others of said circuits each passing through the activated switch mechanism of the related #1 relay and in one instance including said electrically operated valve-opening device, in another instance including the solenoid of the #2 relay and in yet another instance including the solenoid of the #3 relay, still others of said circuits including in one instance the motor for the compressor and in another instance the motor for the dasher and passing through the activated switch mechanisms of the #2 and the #3 relays, respectively, and still others of said circuits each passing through the inactive switch mechanism of the non-related #2 relay and in one instance including the high temperature follow-up switch together with the solenoid for the #2 relay, in another instance including the high temperature follow-up switch together with the solenoid for the #3 relay, and in a third instance including the high temperature follow-up switch together with said electrically operated valve-opening device.

11. In a two-sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for the suction line of each of said refrigeration systems movable from a normal blocking position into an open position permitting refrigerant to circulate through the system, a respective electrically operated device for opening said valves, respective sets of switch devices related to each of said heads and including, in each set, one manually closed starter switch, a normally-closed follow-up switch thermally controlled to cut out at a low temperature, a follow-up switch thermally controlled to open and close at the high and low limits of a higher temperature range, and a #1, a #2, and a #3 relay, said starter switch being wired in a series circuit which passes through the inactive switch mechanism of the non-related #1 relay and being timer-controlled so as to open automatically upon the expiration of a given short-interval time setting, respective electrically operated means for each of said heads operative when activated to deliver a charge of mix to the related head, and a plurality of normally open series electric circuits for each of the two sides of the freezer, one of said circuits including the starter switch and the solenoid of the #1 relay, another of said circuits including the starter switch and the electrically operated means which charges the mix, still another of said circuits passing through the activated switch mechanism of the energized #1 relay and including the low-temperature follow-up switch and the solenoid of the #1 relay so as to be self-energizing for activation of the concerned switch mechanism, yet others of said circuits each passing through the activated switch mechanism of the related #1 relay and in one instance including said electrically operated valve-opening device, in another instance including the solenoid of the #2 relay and in yet another instance including the solenoid of the #3 relay, still others of said circuits including in one instance the motor for the compressor and in another instance the motor for the dasher and passing through the activated switch mechanisms of the #2 and the #3 relays, respectively, and still others of said circuits each passing through the inactive switch mechanism of the non-related #2 relay and in one instance including the high temperature follow-up switch together with the solenoid for the #2 relay, in another instance including the high temperature follow-up switch together with the solenoid for the #3 relay, and in a third instance including the high temperature follow-up switch together with said electrically operated valve-opening device.

12. In a two sided commercial ice cream freezer having a respective freezing head for each of its two sides, two refrigeration systems, one for each head, having common to both systems a single compressor and a single electric motor for driving the compressor, a respective dasher and a respective dasher-driving electric motor for each of said heads, a respective valve for the suction line of each of said refrigeration systems movable from a normal blocking position into an open position permitting refrigerant to circulate through the system, a respective electrically operated device for opening said valves, respective sets of switch devices related to each of said heads and including, in each set, one manually closed master switch, a follow-up switch thermally controlled to open and close at the high and low limits of a given temperature range, and a #1, a #2, and a #3 relay, both the master switch and the follow-up switch being each so wired in a cross-over series circuit including the switch mechanism of the non-related #1 relay as to impose current upon said master and follow-up switches only when the solenoid of the non-related #1 relay is de-energized, a respective motor-driven timer for each master switch set in motion by completion of a circuit through said switch and operative to open the switch upon the expiration of a given long-interval timesetting, and a plurality of normally open series electric circuits for each of the two sides of the freezer, one of said circuits including the master switch and the solenoid of the #2 relay, three others of said circuits including in one instance the solenoid of the #3 relay, in another instance the solenoid of the #1 relay, and in the third instance the electrical device for opening the valve and in each said instance being wired through the activated switch mechanism of the #2 relay so as to be completed upon an energizing of said relay, still another of said circuits including the motor for the compressor and passing through the activated switch mechanism of the #1 relay so as to be completed upon an energizing of said #1 relay, another of said circuits including the motor for the dasher and being wired through the activated switch mechanism of the #3 relay so as to be completed upon an energizing of the #3 relay, and three others of said circuits including in the first instance the solenoid of the #1 relay, in the second instance the solenoid of the #3 relay, and in the third instance the electrical device for opening the valve and each passing through the follow-up switch.

13. Structure according to claim 12 having for each of said heads a mix-containing reservoir, a connection containing a normally closed valve through which mix is fed from the reservoir into the head, an electrical device operative when energized to open said valve and wired in series with the master switch and with a secondary normally closed switch, and means causing said secondary switch to open upon the expiration of a short time interval.

14. Structure according to claim 13 in which the means last recited is an electrical device performing the function of a relay having a thermogenic element contained therein and operating upon its opening of said secondary switch to maintain the secondary switch open until the master switch opens and being then automatically re-set in a condition responsively closing said secondary switch.

15. In a commercial ice-cream freezer, in combination: two freezing heads, a respective refrigeration system for each of said heads including, common to both systems, a single compressor and a single electric motor for driving the compressor, a respective valve for each of said refrigeration systems movable from a normal closed position isolating the related freezing head into an open position permitting refrigerant to circulate through the system, a respective electric device for each of said valves operable when energized to open the valve, a mix-containing reservoir for each of said heads, a respective electrical device for each of said heads operable when energized to feed a measured charge of mix from the reservoir into the related head, and a respective set of normally open electric circuits one related to one and the other related to the other of the two heads each including a relay and acting upon completion to energize the compressor-driving motor together with the related relay and the related two electrical devices and requiring for said completion that the non-related relay be de-energized.

16. Structure according to claim 15 characterized in that the measuring of the charge of mix is determined by the time interval during which the responsible electrical device is energized, means being provided for de-energizing said electrical device upon the expiration of a given short time interval and without affecting continued energizing of the related relay, the related other electrical device, and the motor for the compressor.

17. Structure according to claim 16 in which there is provided for each of said heads a respective thermally controlled switch responding to the temperature condition of the related head and and acting to make and break circuits through the related relay, the related valve-operating electrical device, and the motor for the compressor as the temperature of the related head falls below and rises above the bottom and top limits, respectively, of a given temperature range.

18. In a commercial ice-cream freezer, in combination: two freezing heads, a respective refrigeration system for each of said heads, including, common to both systems, a single compressor and a single electric motor for driving the compressor, a respective valve for each of said refrigeration systems movable from a normal closed position isolating the related freezing head into an open position permitting refrigerant to circulate through the system, a respective electric device for each of said valves operable when energized to open the valve, a mix-containing reservoir for each of said heads, a respective electrical device for each of said heads operable when energized to feed a measured charge of mix from the reservoir into the related head, a respective relay for each head, a respective normally open electric circuit for each of said last-named electrical devices passing through an inactive switch blade of the non-related relay, a respective manually closed switch for each of said circuits, a respective normally open electric circuit for the solenoid of each of said relays passing through an inactive switch blade of the non-related relay, a respective thermally controlled switch for each of said last-named circuits made responsive to the temperature condition of a related freezing head so as to open and close as the temperature of said head falls below and rises above the bottom and top limits of a given temperature range, and respective sets of normally open electric circuits for each of said heads operating when closed to energize the related valve-operating electrical device and the motor for the compressor and each passing through an active switch blade of the related relay so as to be completed only upon an energizing of said related relay.

19. In a commercial ice-cream freezer, in combination: two refrigeration systems each of which includes a freezing head and having, common to both systems, a single compressor and a single electric motor for driving the compressor, a respective valve for each of said refrigeration systems movable from a normal closed position isolating the related freezing head into an open position permitting circulation of refrigerant through the system, an electric device for each of said valves operable when energized to open the valve, and a respective normally open electric circuit for each of said two refrigeration systems including, in each said circuit, a respective switch and a respective second device energized by electricity, said electric circuits acting upon completion to energize the related motor and both the first-named and second-named related electric devices and being characterized in that, for completion, said circuits each require that the related switch be closed and the non-related second said electric device be de-energized.

20. The freezer of claim 19 having a mix-containing reservoir and providing, for each of the two systems, a respective third electrical device caused to be energized upon completion of the related electric circuit and operable when energized to feed a measured charge of mix from the reservoir into the related freezing head.

21. Structure according to claim 20 characterized in that the measuring of the charge of mix is determined by the time interval during which the related said third electrical device is energized, means being provided for de-energizing the related said third electrical device upon the expiration of a given short time interval and without affecting continued energizing of the motor and the related said first and second electrical devices.

References Cited in the file of this patent
UNITED STATES PATENTS

| Number | Name | Date |
|---|---|---|
| 1,473,965 | Wegner | Nov. 6, 1923 |
| 1,675,361 | Layman | July 3, 1928 |
| 1,693,677 | Swift | Dec. 4, 1928 |
| 1,735,724 | Bergdoll | Nov. 12, 1929 |
| 1,756,261 | Pfouts | Apr. 29, 1930 |
| 1,866,989 | Shipley | July 12, 1932 |
| 1,866,990 | Shipley | July 12, 1932 |
| 2,015,493 | Morrow | Sept. 24, 1935 |
| 2,209,979 | Johnson | Aug. 6, 1940 |
| 2,304,094 | Holman | Dec. 8, 1942 |
| 2,328,810 | Johnson | Sept. 7, 1943 |
| 2,446,156 | Kolz | July 27, 1948 |
| 2,508,435 | Tacchella | May 23, 1950 |
| 2,559,032 | Tacchella | July 3, 1951 |